INVENTORS
JOHN P. CHISHOLM
MARTIN R. BATES
ROGER B. RUSSELL JR
ATTORNEYS

INVENTORS
JOHN P. CHISHOLM
MARTIN R. BATES
ROGER B. RUSSELL JR

ATTORNEYS

INVENTORS
JOHN P. CHISHOLM
MARTIN R. BATES
ROGER B. RUSSELL JR

*Alexander & Dowell*
ATTORNEYS

3,161,869
**NON-INTERFERING PLURAL COMMUNI-
CATIONS SYSTEM**
John P. Chisholm, Olympic Valley, Calif., and Martin
R. Bates, Kenmore, and Roger B. Russell, Jr., Williams-
ville, N.Y., assignors to Sierra Research Corporation, a
corporation of New York
Filed Aug. 1, 1962, Ser. No. 213,924
19 Claims. (Cl. 343—5)

This invention relates to a novel system for preventing mutual interference between plural periodic communications units all operating on the same frequency on a time-sharing basis but without the units being synchronized with any common time clock, and more specifically provides a novel system for establishing and maintaining a non-interfering sequence of operation among these units, thereby preventing any one of said periodic units from operating on said common frequency while another unit is in operation thereon and until a safe period of time thereafter.

The present system, although of general applicability to any system of units having the above described characteristics, was specifically developed to prevent mutual interference between plural radar units all operating on a common frequency and within range of each other. Therefore, the present system will be described and illustrated in connection with radar equipment, although the system is not limited to use with radar equipment.

There are a great many practical situations in which a plurality of similar radars are operated on substantially the same frequency and within range of each other. For example, in a harbor there may be a plurality of installations both mobile and fixed showing substantially the same frequency, and therefore in danger of causing mutual interference. In connection with military manoeuvers, there are situations in which a plurality of aircraft or other vehicles all having substantially identical radar systems, or other periodic communications systems, are carrying out a tactical manoeuver within a relatively small area and therefore subject to mutual interference. One prime example in which such tactical manoeuvers are carried out over long periods of time occurs in connection with antisubmarine warfare using a plurality of helicopters all equipped with substantially identical radar systems and hovering within a relatively small area in an effort to locate a submarine using dip sonar transducers. In cases where there are a relatively large number of such installations the mutual interference would be tremendous between radars operating on similar frequencies, and this interference would be reduced only to a very slight extent by the directional characteristics of the antennas associated with the radar units. In general, there are several possible approaches to the problem of mutual interference, including (1) the assignment of definite time slots to the various radar units on a time-division basis and employing a master time base, for instance located in a master radar unit, to which all of the other radar units are slaved; (2) allow all of the radar units to operate in random sequence as though each were the only one occupying the area in question and accept as unavoidable the mutual interference; and (3) operate each of the radar units on a different frequency. The second alternative involves such serious mutual interference that the operator of a radar unit cannot rely on the indications which he receives with any degree of certainty. The third alternative involves the allocation of so many different frequencies as to make this approach quite impractical. Moreover, each of these frequencies must be assigned to only a single unit, and in the heat of battle, this assignment would require direct phone communications between the various operating units, which requirement would be a disadvantage making it possible for opposing forces to jam such communications or to use direction finders to locate the units. Moreover, this type of operation imposes the likelihood of human error by which the same frequency might become assigned to two units, which would mean that neither of these units could then rely upon its radar. These disadvantages seem to rule out the third alternative listed above.

With respect to the first alternative, in which all of the units are slaved to a single master unit, this system also has serious tactical disadvantages. For example, in the helicopter situtation, one of the helicopters has to be assigned the master function and the other helicopters then all become slave units. This system may operate in a satisfactory manner in the early stages of a tactical manoeuver, but it tends to become confused as the manoeuver proceeds because of the requirement that there must at all times be one and only one master unit on the air. At first, when the pack of helicopters enters into such a manoeuver, it is easy to establish which helicopter is assigned the role of the master unit to which all of the other units are slaved, but then as time goes on and the helicopters begin to drop out and return to the base for refueling, and as other helicopters enter the scene and take the places of those which have returned to base, each of these helicopters approaching must be pre-assigned to one definite time slot, and if accidentally assigned the wrong time slot, mutual interference results which destroys the efficiency of the radar units on two helicopters at a time. Moreover, the master unit may become damaged, without realizing such damage, in which case, the whole system degenerates. Furthermore, as the master unit returns to base for refueling, and a new master approaches, there may result an interval of confusion until the new master successfully takes over the role of the old master and all the slave units become appropriately synchronized therewith. All of these features of the system add to the burden of the personnel in the master helicopter and divide their attention by imposing extra duties of assigning different time slots to each of the units in the air, it also being essential that the personnel in the master unit continuously monitor the master function to make sure that it is properly operating at all times.

It is the principal object of the present invention to provide a novel system embodying a totally different approach to the problem of mutual interference, said novel system permitting all of the radar units to automatically establish and maintain a sequence of operation from an initial turn-on situation in which operation is purely random. Moreover this novel system automatically functions to re-establish an operation sequence when some of the radar units are changed, as when some units are removed from the scene and other different ones are brought up to take their places. This novel system completely eliminates the chance of human error in establishing a predetermined order of operation, and also permits the plurality of radar units to continuously correct and adjust the order of operation to existing conditions and to the number of units in operation at any particular time.

It is another major object of this invention to provide a system for establishing an order of operation among a plurality of communication units operating on a time-sharing basis, and each unit having its own self-contained time clock which serves to establish the pulse repetition rate of the unit, but which time clock is not synchronized with any standard or with the time clock in any other radar unit. In particular, it is an object of the invention to provide a system in which a simple time clock can be used, thereby eliminating the need for highly accurate clock means such as an oven-controlled crystal clock, or a Cesium Vapor clock. An ordinary crystal clock having an error of $10^{-4}$ or less is satisfactory to insure maintenance of the sequence for intervals of fade up to about 5 seconds duration assuming that during a fade of this duration, the clock-drift between two radars should not exceed 500 microseconds:

$$\frac{500 \times 10^{-6}}{5} = 10^{-4} \text{ relative error}$$

It is another extremely important object of the invention to provide in the present system special tie-breaking means for quickly establishing an order of operation among a plurality of time-sharing communication units in which the order is self-correcting so that if any unit becomes out of step with any other unit, the situation corrects itself almost immediately, and establishes a new and satisfactory order.

In the radar example illustrating this invention, as described below, a plurality of radar units of ordinary design are assumed to be operating within range of each other on the same frequency. Each unit has a self-contained time clock system which establishes its pulse repetition rate, and these pulse repetition rates are generally similar, although not mutually synchronized. Each radar includes a transmitter and a receiver, all tuned to substantially the same frequency among the various units, all as known and described in the prior art. However, in addition to these conventional radar components each of the radars is provided with a logic system connected with the radar receiver so that if the present radar receives a pulse from another unit immediately prior to the instant of its own transmission, the logic system then resets to zero the origin of the time clock system within the present radar and the present radar waits for a certain interval of time before making another attempt to transmit its radar pulse. This system is satisfactory assuming that no two units transmit pulses substantially simultaneously, such that one unit has not yet received the pulse from the other unit at the time that it transmits its own pulse. There is, however, the possibility of a tie between two or more units, and for this reason the system is further provided with a tie-breaking circuit which applies a random jitter to each radar timing system so that even though two radars may be mutually synchronized when the units are first turned on, the random jitter will soon cause one to operate sufficiently ahead of the other that the other unit will receive the pulse from the first unit prior to transmitting its own pulse, thereby establishing an order in which the other unit transmits after the first mentioned unit. The timing of the logic is such that once the process of establishing a non-interfering sequence of events has run, the established order can be easily maintained without likelihood of mutual interference. In other words, a fixed order of operation is established, and the positions of each of the radars in that order are mutually separated by sizable intervals of time sufficient to establish a temporal guard-space between the operations of the various radar units. The system is analogous to a hike by a group of Indians along a very narrow cliffside path, wherein once the hikers have established a given order on the path, it is virtually impossible for them to get out of order.

Other objects and advantages of the invention will become apparent during the following discussion of the drawings, wherein.

Figure 1:
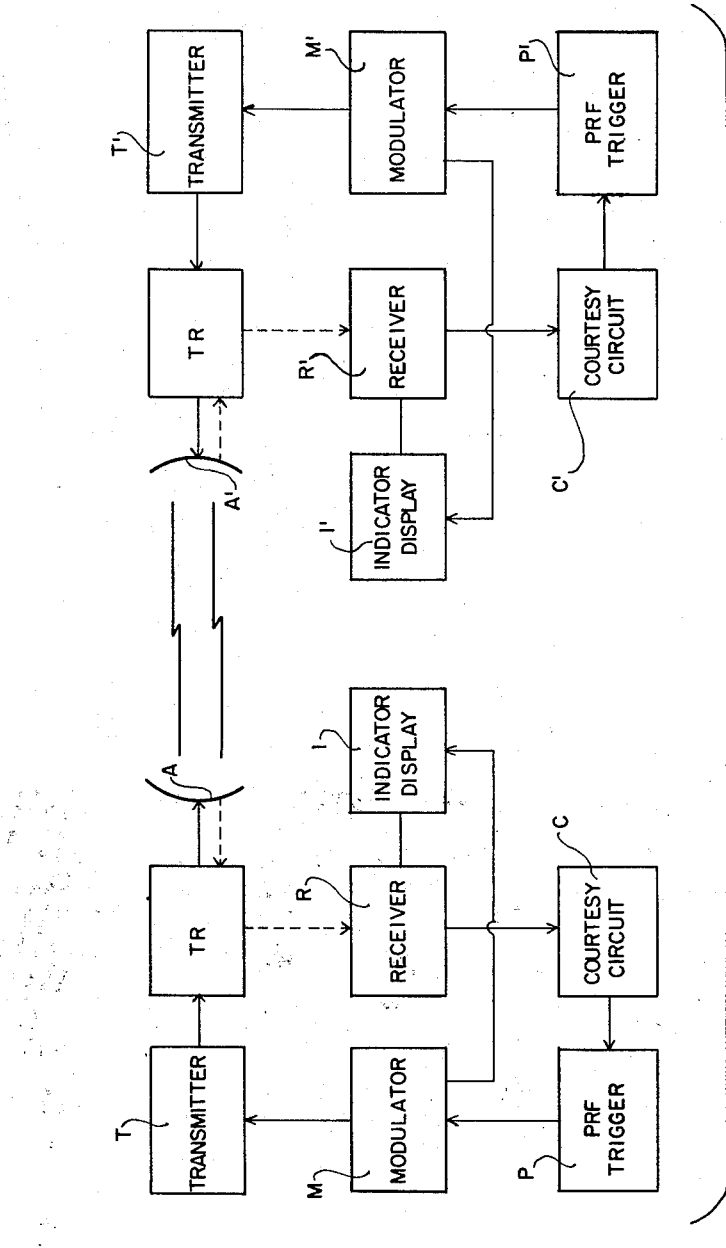
FIG. 1 is a block diagram showing two radar units equipped according to the present invention operating on the same frequency and within range of each other.

Referring now in detail to FIG. 1, this figure illustrates two substantially identical radar units respectively including antennas A and A' coupled by TR boxes with transmitters T and T'. These transmitters are pulsed by modulators, respectively labeled M and M', and these modulators are in turn operated by pulse repetition trigger units, labeled P and P'. These radars further include receivers R and R' and indicator display units I and I'. The units described thus far are conventional and constitute the component parts of a conventional pulse radar.

In addition in these block diagrams, there are added novel interference-prevention "courtesy" circuits labeled respectively C and C', which circuits comprise the novel subject matter of the present disclosure and cooperate with the other units of the radar to produce novel results. Considering for instance the left-hand radar unit of the diagram of FIG. 1, the courtesy circuit C is connected with the pulse trigger unit P and controls whether or not this circuit triggers the modulator to send out an interrogation pulse from the transmitter T through the antenna A. In an ordinary radar set the pulse repetition frequency timing unit is permitted to run continuously and deliver a train of periodic timing pulses. However, in the present system the pulse trigger unit P can pulse the modulator M only when actuated to do so by the "courtesy" circuit C. In general the function of the "courtesy" circuit C is to periodically deliver a trigger signal actuating the trigger unit P to fire the modulator M, and ordinarily this signal from the "courtesy" unit C to the trigger unit P appears at a substantially fixed periodic rate. However, if the "courtesy" circuit C receives a signal from the receiver R resulting from a received interrogation pulse from another radar unit, then the "courtesy" circuit C inhibits its associated trigger unit P from firing the modulator M until a certain number of microseconds have passed. If at the end of this time no other signal representing an interrogataion pulse from another radar has been delivered by the receiver R to the "courtesy" circuit C, then the "courtesy" circuit C delivers its enabling signal to the pulse repetition frequency trigger unit P and its own radar then sends out its interrogation pulse. The exact manner in which this circuit operates will become apparent during the following more detailed discussion of the precise nature of the "courtesy" circuit C.

Figure 2:
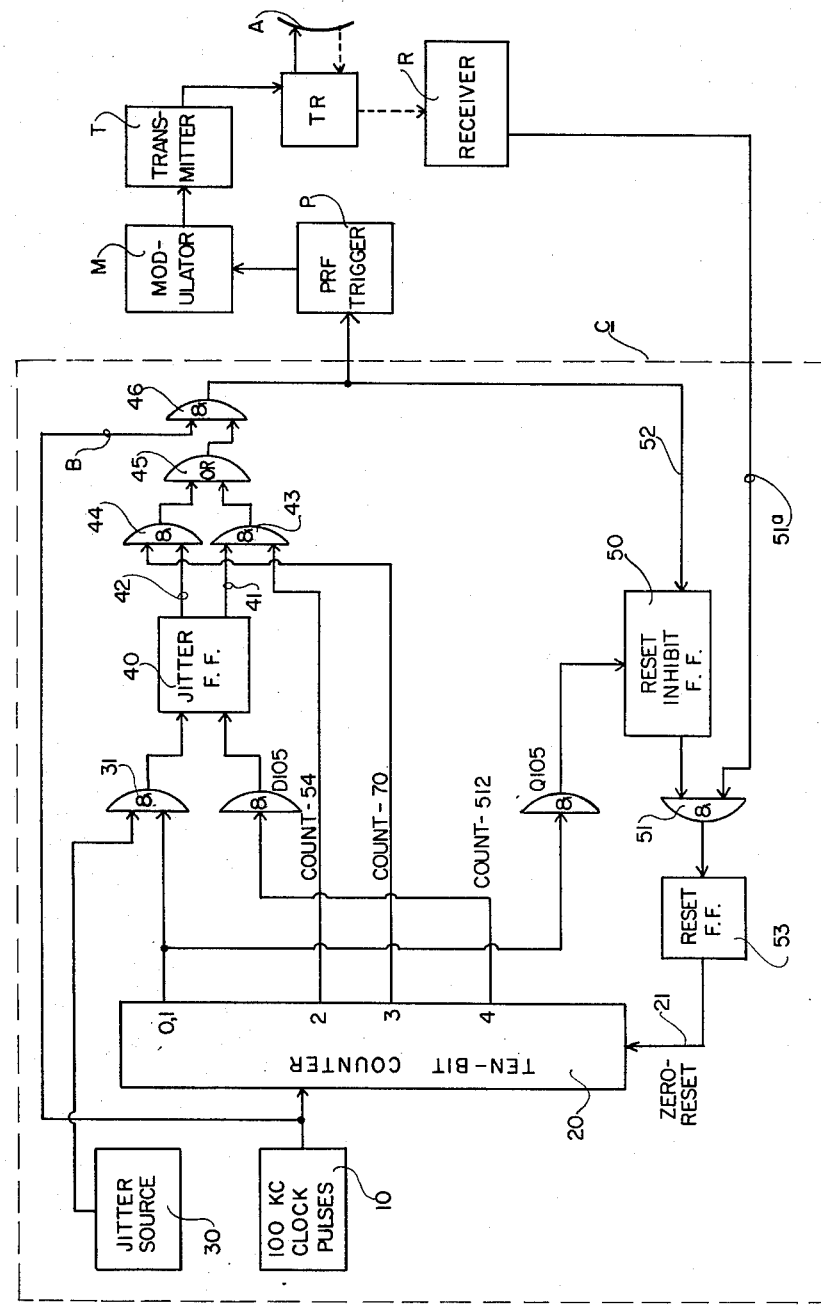
FIG. 2 is a block diagram showing in greater detail one of the radar units of FIG. 1, and particularly showing the means for preventing mutual interference.

Referring now to FIG. 2, the block diagram of one radar unit is repeated at the right side of the figure, and the "courtesy" circuit C is shown in greater detail to the left thereof. Essentially, this latter circuit comprises a timing generator which actuates the trigger unit P of the radar system periodically to send out an interrogation signal. Basically, it comprises a 100 kc. clock pulse oscillater 10 driving a counter 20 of any suitable design. In the practical embodiment of the invention, this counter comprises a ten-bit flipflop counter including ten separate flipflops, each one being capable of two different outputs on a binary logic basis, each flipflop putting out either a binary zero or a binary one. Since this is a ten-bit counter, the count is from zero to the numeral 1024, this numeral and the zero numeral actually comprising the same condition in which the output of the counter is binary 0000000000. This ten-bit counter also has a zero reset input terminal 21, and in the particular counter employed whenever this terminal 21 is grounded all flipflops within the counter are immediately reset to zero, and the counting cycle begins all over again with the next succeeding pulse from the 100 kc. clock 10.

By the use of diode logic networks, several different counts are appropriately selected at the output of this counter and are used as possible times in the counting cycle, from zero to 1024 when the pulse repetition trigger P can be actuated to trigger the modulator M to transmit a radar pulse. The particular counts for this purpose have been arbitrarily selected as the count 54 and the count 70. Ordinarily, only one count of this type would be sufficient in a radar system that was operating all by itself, but the reason for using two possible output instants one of which is randomly selected in this system is to provide means for preventing the possibility of precisely synchronized transmissions by two radars for a protracted period of time. Because the radars are located some distance apart in space, it is conceivable that two radar units could fall into a tie-situation when they are first turned on and transmit their pulses so nearly at the same time that the time lag involved in the travelling of a pulse from its own antenna to the antenna of another radar would be sufficient to allow the other radar to transmit its pulse before the pulse from the first radar entered the receiver of the second radar to inhibit it from transmitting its own pulse. However, if two different transmission instants are available in each radar, which instants are separated by a substantial interval of time of at least 60 microseconds for a one-way range lag at 20 miles, or in the present example a difference of about 160 microseconds between count 54 and count 70, and if one of these two instants of transmission is selected arbitrarily and in a substntially random manner, then within several transmissions one of the radars will receive a pulse from the other radar before it transmitted its own pulse, and thereby the tie will be broken and the later radar will wait in the manner to be described hereinafter for a sufficient length of time so that it will fall into step behind the earlier radar in the time sequence.

In order to select which of these two counts, count 54 or count 70, will be used to trigger the transmitter modulator, a random jitter source 30 is provided, which can be an amplified signal from any free running oscillator which has relatively poor stability, and therefore provides an output jitter varying as a function of time. For example, if this is an aircraft installation, the 400 cycle generator of the aircraft can be used as this jitter source 30, especially if it has a frequency which depends on the aircraft engine speed which in turn is a function of instantaneous wind loading of the propeller. In other words, the phase of the 400 cycle source, and in fact its frequency, varies considerably over a period of time. In cooperation with this source 30, a jitter flipflop 40 serves to select one of the other of the two counts, the count 54 or count 70, depending on the condition of conductivity of the flipflop at any particular instant. For instance, the jitter flipflop 40 has a binary zero output along the line 41 and a binary one output along the line 42, and one of these two lines will be conductive at any instant of time. Two "and" gates 43 and 44 are connected with the binary zero and binary one outputs of the jitter flipflop 40, and the conductivity of these gates is determined by whichever of the output lines 41 or 42 is conductive at any particular instant of time. If the gate 43 is conductive, the count 54 triggers the pulse repetition frequency trigger P and the radar sends out an interrogation signal on this count. On the other hand, if the gate 44 is conductive, the radar sends out an interrogation pulse on the count 70. One of these two outputs is passed by the "or" circuit labeled 45, and the output of the "or" circuit passes through the "and" gate 46 to the pulse repetition frequency trigger P. This signal from the gate 46 to the trigger P also passes downwardly through connection 52 to a reset circuit generally including two flipflops 50 and 53. At count zero (on counter 20) a reset-inhibit flipflop 50 is set, permitting a reset gate 51 to pass received radar pulses from the receiver R to actuate flipflop 53, which functions to reset the counter 20 to zero. However, once the system has passed its own trigger pulse through the "or" gate 45 and through "and" gate 46 (corresponding to a radar transmission at a count of either 54 or 70 on counter 20), the reset inhibit flipflop 50 is blocked, preventing the transmission of received pulses through gate 51, and thus preventing the reset of counter 20 until after count 1023.

The manner in which the jitter flipflop 40 is caused to select either the count 54 or the count 70 is intended to be random in nature so that it may select one count several times in a row and then select the other one a different number of times. In other words, it is not desirable that this count-selection be made alternately, but that it be made in a truly random fashion. The jitter source 30, which we assume is a signal of somewhat unstable phase characteristics, such as a poorly regulated 400 cycle generator, is fed into an "and" gate 31 together with the binary zero count output of the counter 20, which is also the 1024-count output thereof. The "and" gate 31 comprises a diode gate as will be more fully described in connection with FIG. 3, and the jitter source biases this diode either conductive or nonconductive. Thus, if the gate is conductive, the 1024th count of the counter 20 will set the jitter flipflop to a definite condition of conductivity. On the other hand, if the jitter source biases the gate 31 nonconductive, then the 1024th count of the counter 20 has no effect on the jitter flipflop, leaving it in the condition which existed just prior to the 1024th count, the jitter flipflop 40 being bistable in nature. In addition, one other arbitrary count is selected at which the jitter flipflop is reset to zero by the counter 20. Such a count can be arbitrarily selected, for instance at the count 512. In other words, the ten-bit counter 20 puts out a pulse at 512. If the jitter flipflop is already in the condition of conductivity to which the pulse 512 tends to set it, then this pulse has no effect, but on the other hand if the pulse 512 reaches the jitter flipflop in the opposite condition of conductivity, then this flipflop 40 will be reversed. Therefore, there are two points at which the counter 20 and the jitter source 30 can change the setting of the jitter flipflop 40 so as to arbitrarily select either the count 54 as the output instant for the interrogation pulse of the radar, or the count 70, for this purpose. Hence it can be seen that if two radars equipped with "courtesy" circuits as shown in FIG. 2 are operating simultaneously, and are in condition of exact synchronism so that each is sending out its interrogation pulse before it receives the other's interrogation pulse, this random jitter selection of the precise time of firing of the radar interrogation pulse will within several of the pulse cycles cause the two radars to drop out of synchronism so that the later-firing radar will be inhibited from firing its pulse at an interfering time and will be caused to wait until a later time to send out a radar pulse.

It is only necessary that the jitter flipflop 40 be prevented from reversing its condition of conductivity between the count 54 and the count 70, and this can be accomplished by selecting counts, namely the counts 512 and 1024, which lie outside of the range of the numbers between 54 and 70.

There are several conditions which cause resetting of the counter 20 to zero. If this counter counts all the way to count 1024, it has then completed its cycle and since the count 1024 corresponds with the count zero the counter is inherently in reset condition. The other condition which causes it to reset occurs when the counter 20 has counted from zero up to some count preceding the selected firing count 54 or 70, and at this point the receiver R receives an interrogation pulse from another radar. When this occurs, the received interrogation pulse is delivered by the receiver R to the reset switch gate 51 which triggers reset flipflop 53 which then grounds the terminal 21 and resets the counter to zero. Since it was specified that the interrogation pulse from the other radar was received at the present receiver R prior to whichever count 54 or 70 was being selected in the present radar, it will be seen that the counter is accordingly reset to zero without the transmitter in the present unit firing its pulse. Since every count of the counter corresponds with about ten microseconds of time, it is apparent that the present radar will have been inhibited from firing a pulse for at least 540 microseconds, and perhaps 700 microseconds. This allows ample time for the other radar to receive echoes from the pulse which it sent out without interference from the present radar.

In most time-sharing systems for plural communications units of a periodic nature, whether radar systems or telemetric systems or other types which can be broadly classified under communications systems, a single common time base is employed in which the various units are sequentially assigned to various time slots, all measured from a common time-zero. It is a novel feature, characteristic of the present invention, that each unit in the system has its own time-measuring means not synchronized with any other and each having its own time zero; and that when all of the units are operating in sequence, thereby avoiding mutual interference, the various time-zeros of these units are not coincident, but are arranged in the same sequence with enough time between each successive pair of time-zeros to accommodate the complete transmit-receive function of one unit. This is an important distinguishing feature of the present invention.

Figure 3:
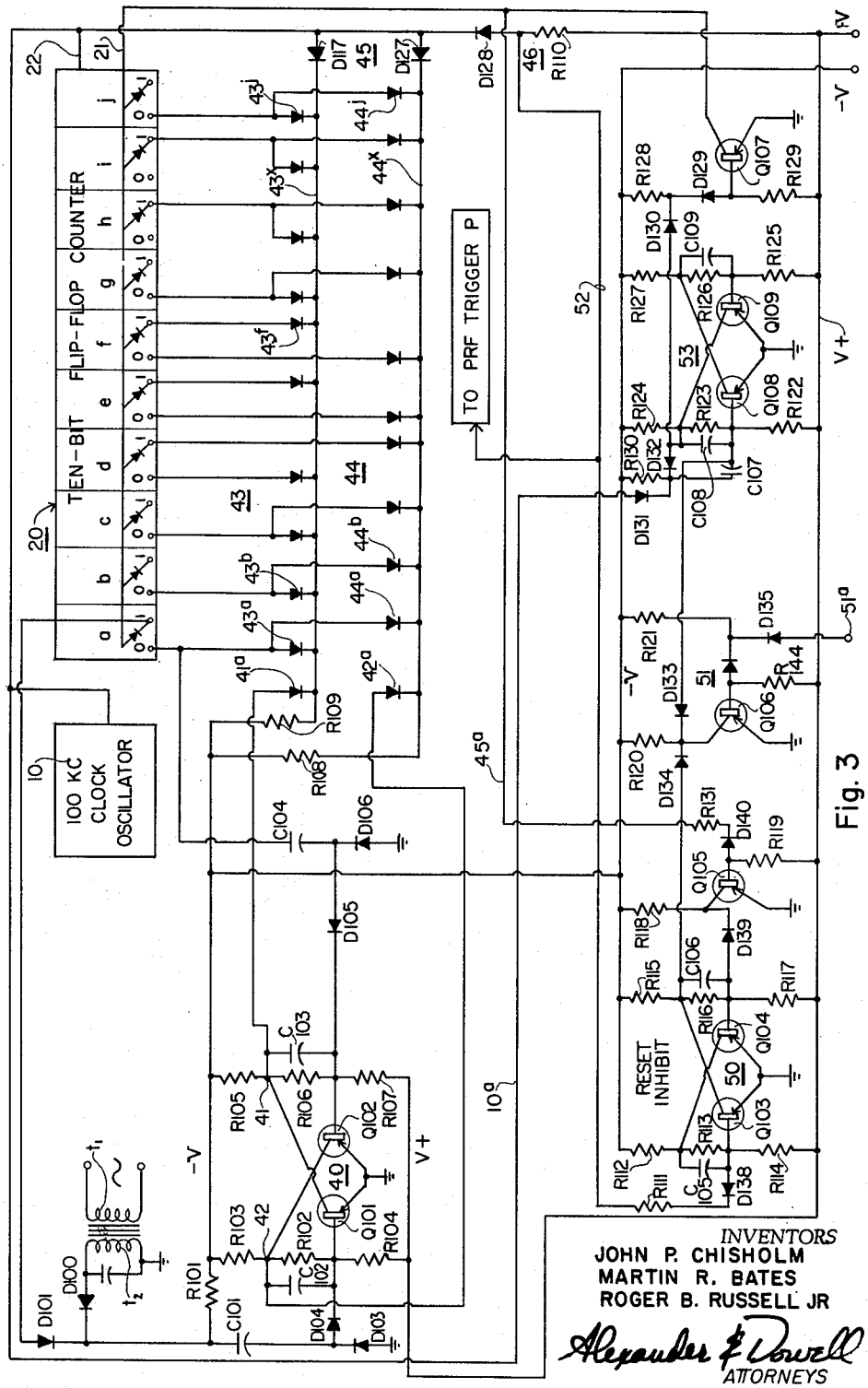
FIG. 3 is a schematic diagram showing a practical working embodiment of the interference-preventing means shown in FIG. 2.

Referring now to the more detailed schematic diagram of FIG. 3, this figure corresponds substantially with the block diagram of FIG. 2, but includes additional details which were omitted in FIG. 2 in order to provide a more general description of the performance. The details of the 100 kc. clock oscillator are not included because of the commonness of such a circuit, this oscillator being illustrated as connected to the input pulsing terminal 22 of the ten-bit flipflop counter 20. This flipflop counter comprises ten bistable multivibrators labeled $a$, $b$, $c$, $d$, $e$, $f$, $g$, $h$, $i$ and $j$, the most significant bit being provided by the flipflop $a$ and the least significant bit being provided by the flipflop $j$. Each of these flipflops is shown as having binary zero and one terminals across the bottom which are appropriately labeled to indicate which is which, and these terminals are connected with diode logical "and" circuits 43 and 44 each of which includes ten diodes, such as the diodes 43$a$, 43$b$ . . . 43$j$, inclusive, connected to appropriate output terminals of the ten-bit flipflop counter 20. For instance, the diode 43$a$ is connected to the zero terminal of the multivibrator $a$, the diode 43$b$ is connected to the zero terminal of the flipflop $b$, but the diode 43$f$ is connected to the binary-one terminal of the flipflop $f$. The code represented by the ten diodes 43$a$ through 43$j$ of the "and" circuit 43 is 0000110110, count 54. Similarly, the diodes 44$a$ through 44$j$ are connected with the flipflops in such a manner as to provide the code 0001000110, count 70. The two "and" circuits are both connected to the minus-V power supply line by resistors R108 and R109 so as to maintain the common sides of the diodes which are not connected to the flipflop counter 20 at approximately —10 volts when the flipflops are providing the corresponding code. When the voltage at the common sides of the diodes is minus 10 volts, which is the voltage of the voltage source, the "and" circuit is actuated, but if one or more of the flipflops is in the wrong conducivitity condition so that at least one of the diodes is connected with a flipflop which is at ground potential, the "and" circuit is blocked. In other words, the resistors R108 and R109 attempt to bias the diodes at the negative line voltage potential, but can do so only if all ten of the flipflops are at the same time nonconductive on the particular sides to which these diodes are connected. Thus, it takes the correct permutation of ten flipflop positions in order to permit the other sides of the diodes to rise to the line voltage. These other sides of the diodes represented by the lines 43$x$ and 44$x$ are connected with an "or" circuit 45 comprising two diodes D117 and D127. As long as both the lines 43$x$ and 44$x$ are maintained at ground potential by one or more of their "and" circuit diodes connected to sides of flipflops which are at the moment at ground potential, no pulse can flow through the diodes D117 and D127 of the "or" circuit 45. However, if one of the diodes in one of the "and" circuits is connected to the output side of a multivibrator which is at V-minus potential, then a negative pulse is transmitted by the line 43$x$ or 44$x$ through its own diode D117 or D127, thereby permitting current to flow through the diode D128 and thence through the resistor R110 to the plus V line and thereby deliver a negative pulse along the line 52 to trigger the reset flipflop 50 in a manner to be hereinafter discussed.

As related above in general terms, the jitter flipflop 40 selects one of the two "and" circuits 43 or 44 in order to select either a 540 microsecond time or a 700 microsecond time from the count zero of the counter 20 for transmitting the output radar pulse. The jitter flipflop 40 serves the purpose of enabling one of these "and" circuits 43 or 44 while disabling the other one. The flipflop 40 is a bistable multivibrator having two outputs, from the terminals 41 or 42, one of these terminals being conductive while the other one is nonconductive at any particular instant of time. The terminal 41 is connected to the collector of the transistor Q101, and if this transistor is instantaneously nonconductive, then the voltage at 41 will be almost equal to the full minus 10 volts of the line —V. Therefore, no current will be conducted through the resistor R109 and the diode 41$a$, and therefore the diode logic circuit 43 will not be prevented from operating, as it would be if the transistor Q101 were conductive so that it would appear to be substantially a short-circuit to ground, in which case current would be conducted through the resistor R109 and the diode 41$a$ to thereby prevent the "and" circuit 43 from developing a negative voltage on the line 43$x$.

Likewise, a diode 42$a$ is connected from the terminal 42 to the common conductor 44$x$ of the diode "and" circuit 44 so that if the transistor Q102 is nonconductive, the voltage at point 42 will be substantially equal to the minus line voltage —V and therefore no current will be conducted through the resistor R108 and the diode 42.

Thus, if the counter multivibrators in the flipflop counter 20 are at the proper coded position, the "and" circuit 44 can conduct a negative pulse to the diode D127. On the other hand, if the transistor Q102 is conductive and therefore represents substantially a shortcircuit from the point 42 to ground, then considerable current will be drawn through the diode 42$a$ and the resistor R108 and thereby prevent the common conductor 44$x$ from rising to a negative value approaching ten volts. Thus, in this latter case, the diode "and" circuit 44 would be disabled.

The condition of conductivity of the two transistors Q101 and Q102 of the jitter flipflop 40 is determined by several factors. The 400-cycle supply, or some other jitter source, is connected to the primary winding $t_1$ of a transformer having a secondary winding $t_2$ connected through a diode D100 and a small capacitor C101 to the base of transistor Q101 through the diode D104. If the upper terminal of the winding $t_2$ is negative, at a particular instantaneous value of line voltage, the presence of this voltage has no effect on the rest of the circuit because it is blocked by the diode D100. However, if this voltage is positive at any particular instant, the diode D100 applies a positive voltage at the common terminal with the diode D101, and thereby blocks this diode by back-biasing it. When the counter has counted through its complete counting cycle, namely to count 1024, or zero, the flipflop $a$ delivers a pulse at its output terminal binary one and delivers this pulse to the diode D101. If the diode D101 is blocked by the presence of a positive voltage across winding $t_2$, nothing happens, but if the diode D101 is not blocked, the pulse from the flipflop $a$ of the counter 20 passes through the diode D101 through the condenser C101 and through the diode D104 and biases the transistor Q101 off thereby resetting the multivibrator if the transistor Q101 was conductive. If not conductive, this pulse has no effect on it. Incidentally, the condenser C101 is small enough in value so that it cannot pass any of the 400-cycle signal from the jitter source connected to the primary winding $t_1$. The diode D103 prevents the trailing edge of the counter pulse from triggering the jitter flipflop 40. A suitable D.C. bias potential is provided at the junction of the diodes D100 and D101 by the resistance R101 connected with the minus V line.

Thus it appears that at count 1024 there is a random selection made as to whether the multivibrator is driven to a reset condition by driving Q101 nonconductive. This determination hinges on whether a positive pulse is applied at the left side of the flipflops 40, which in turn is determined by the instantaneous value of the 400-cycle line voltage, depending on whether it is positive or negative. If it is negative at the instant of count 1024, the pulse is admitted to reset the flipflop 40 but if it is positive the pulse from the binary terminal of the flipflop $a$ of the counter 20 is blocked and does not affect the flipflop 40.

Furthermore, if at the count 512, the transistor Q102 is conductive, the counter 20 then resets the flipflop 40 by driving the transistor Q102 off. This determination does not depend upon the condition of the 400-cycle line voltage. At count 512 a positive pulse is delivered from the binary zero terminal of the flipflop $a$ of counter 20, and this pulse is fed through the capacitor C104 and through the diode D105 into the base of the transistor Q102. Thus, at count 512 the pulse always resets the transistor Q102 to the off condition of conductivity which renders the transistor Q101 conductive. The diode D106 prevents the trailing edge of the 512th pulse from affecting the conductivity of transistor Q102.

Thus, at count 512, and thereafter, the transistor Q102 is always shut off if it is not already off. Then in a subsequent count 1024, the condition of conductivity of the transistors in the jitter multivibrator 40 is determined by the instantaneous value of the 400 cycle voltage.

Several conditions must be simultaneously satisfied to reset the counts to zero before it reaches the 1024th pulse. One of these conditions occurs when a signal is received from the receiver along the connecting line 51a, in FIG. 2, indicating that an interrogation pulse has been received from another radar. The other requirement is that a transmit pulse has not occurred since the most recent reset to zero of counter 20. Upon receipt of a pulse from another radar, if the present radar has not yet transmitted, the pulse passes through the reset switch gate 51 and subsequent circuits and resets the counter by grounding the reset terminal 21.

In general it is desirable to reset the counter 20 to zero if a pulse from another radar is received before the present radar's own pulse is transmitted. On the other hand, if no pulse is received from another radar between the time when the counter 20 is reset to zero and the time when the present radar's pulse is transmitted, then it is desirable to have the counter 20 complete its count up to 1024 without being reset to allow other radars to transmit during this interval. In this way, the present radar is able to maintain its own repetition rate, which is interrupted only if an interrogation pulse is received from another radar before the present unit transmits its own interrogation pulse. The reset inhibit flipflop 50 accomplishes this purpose, this flipflop being a bistable multivibrator whose condition of conductivity is "set" at the count 1024 (or zero) and reset at the instant the radar transmits its pulse. This action first enables and then blocks gate 51 from passing received pulses to reset line 21. The reset terminal 21 of the counter 20, as stated above is normally maintained at $-10$ volts, but when this terminal is grounded, the counter resets to zero. The terminal 21 is always at ground potential at the count zero of the counter 20. Thus, the lead 45a, FIG. 3, which leads to an inverter Q105 through the diode D140 normally maintains the base of the transistor Q105 biased with a minus potential, meaning that the transistor Q105 is fully conductive most of the time. However, at count zero, this negative bias is grounded and the transistor is then cut off, meaning that it delivers a brief negative pulse to the transistor Q104 which turns this transistor on and turns off the transistor Q103. The various bias resistors in the multivibrators and the inverters are provided with reference characters which match the table of values at the end of this specification to provide a practical working embodiment.

The negative pulse at count zero, delivered by the collector of Q105 through the diode D139, resets the flipflop 50 such that Q104 is conductive and Q103 is cut off. Ordinarily, current is being conducted through resistor R120 and diode D134 through Q103 to ground. However, when Q103 is cut off by the pulse from the inverter Q105, current is no longer drawn through the diode D134 and therefore a negative potential appears at the collector of Q106, and is not drawn off through Q103 when nonconductive. Q106 comprises the "and" gate 51 shown in FIG. 2, and the cessation of bleeding off of the current through D134 partially enables this gate.

This enabled condition remains from count zero of the counter 20 through count 54 or count 70, depending on which count initiates the radar pulse from the present system, and during this interval of time if a signal in the form of a positive pulse is received from the radar receiver R through the line 51a and the diode D135, this positive pulse interrupts the forward bias on the base of the transistor Q106 from the resistor R121 through the diode D137 and thereby cuts off the "and" gate transistor Q106. When this occurs, a negative pulse is transferred through the diode D133 from the collector of Q106 and forward biases the transistor Q108 so as to turn on this transistor and turn off the other transistor Q109 of the reset flipflop 53. Thus, a strong negative pulse is applied at the collector of Q109 which has just been transferred from "on" condition to "off" condition. While the transistor Q109 was "on," it drained off current from the resistor R128 and the diode D130 so that substantially no forward bias was applied to the transistor Q107. However, as stated above, when a pulse is received from another radar by the receiver R and delivered through the diode 135 into the "and" gate 51, the transistor Q109 is cut off and therefore the negative bias stops draining off through the diode D130 and the transistor Q109. Thus, this negative bias is applied to the base of switching transistor Q107 through the diode D129 thereby rendering this transistor conductive and shortcircuiting the reset terminal 21 of the counter 20 to ground. The counter 20 is reset to zero count, when this occurs in response to the appearance of a signal at the radar receiver R, which signal is entered into the reset circuit through the lead 51a.

However, it is desirable that the appearance of a radar signal can reset the present counter to zero only if this counter is counting between the count zero and the count 54 or 70, depending on which count fires the interrogation radar pulse from the present transmitter. Conversely, it is not desirable that the counter be reset to zero after the present system has fired its own radar pulse, and therefore it is necessary that some means be provided to inhibit the resetting of the counter after the main radar pulse is fired from the present transmitter. The output of the "and" gate 46 appears along the line 52 and goes to the trigger unit P in order to initiate a radar pulse whenever either of the two diode logic gates 43 or 44 is rendered conductive by the 54th or 70th pulse of the counter 20. The output signal along the line 52, however, is conducted not only to the trigger P but also goes to the transistor Q103 of the reset inhibit flipflop 50. Ordinarily, the transistor Q103 is nonconductive during the interval between zero count and the transmission of an interrogation pulse, as stated in detail above. However, the application of a negative pulse along the line 52 through the diode D138 renders the transistor Q103 conductive and reverses the flipflop so that Q104 is non-conductive. As soon as Q103 becomes conductive, it conducts the forward bias away from the gate 51 by in effect grounding the bias which normally goes to the collector of transistor Q106 through the diode D134. As soon as this diode D134 is connected to ground through the transistor Q103, the gate is unable to react to an input pulse from the receiver through the diode D135 and therefore incoming radar pulses occurring after firing of the transmitter pulse from the present radar are not effective to cause resetting of the counter 20 which then continues counting to the count 1024 which corresponds with zero count. At zero count, of course, the terminal 21 goes to ground potential from its normal negative potential and thereby sends a positive pulse to the line 45a which is inverted by the transmitter Q105 and applied as a negative pulse through the diode D139 to once again reverse the flipflop 50 so that Q104 is conductive and Q103 is blocked, thereby once again enabling the gate circuit 51 so that an incoming pulse from the receiver on the line 51a will trigger the reset circuit 53 and reset the counter 20 to start counting all over again.

Incidentally, once a received pulse enters the diode 135 and cuts off the transistor Q106 to apply a negative pulse to transistor Q108 and turn this transistor on, at the same time turning off transistor Q109, this flipflop, comprising the last two transistors mentioned, remains in this condition until the next succeeding clock pulse from the 100 kc. clock oscillator 10. This clock pulse arrives through the connection 10a and is applied through an isolation diode D131 and the capacitor C107 to the base of the transistor Q108. It has been assumed in all instances that the clock pulse is positive, and therefore this positive pulse cuts off the transistor Q108 and renders Q109 conductive. Thus, whenever the reset multivibrator Q108–Q109 is actuated to reset the counter 20 it remains in this reset condition in which Q108 is conductive until the next succeeding clock oscillator pulse which then returns it to the other condition of conductivity in which Q109 is conductive and Q108 is nonconductive. In this manner, the flipflop Q108–Q109 is caused to remain for a finite time in the condition in which it resets the flipflop counter to zero, awaiting the next succeeding clock pulse, this finite time being sufficiently long to make sure that the counter chain 20 is actually fully reset to zero.

A practical working embodiment of the circuits shown in FIG. 3 includes the following circuit parameters in the table listed below:

R101, R108, R109, R118, R120, R121, R128, R130, R131—10,000 ohms
R102, R106, R113, R116, R123, R126—8,200 ohms
R103, R105, R112, R115, R124, R127—2,000 ohms
R104, R107, R110, R114, R117, R119, R122, R125, R129, R144—68,000 ohms
C101, C102, C103, 104, 105, C106, C107, C108, C109—.001 microfarad
D100, D101, D103, D104, D105, D106, D41a, D42a, D43a–j, D44a–j, D117, D127, D130, D132, D134, D135, D138—1N118A
D128, D129, D131, D133, D137, D139, D140—Silicon HD4020
Q101, Q102, Q103, Q104, Q105, Q106, Q107, Q108, Q109—2N404

The present novel "courtesy" system is intended also for use with more sophisticated types of radar equipment, for example the type of radar which transmits an "arm pulse" or a coded group of "arm pulses" which are known in connection with various types of time-sharing radar systems. The transmitting of arm pulses a certain number of microseconds prior to transmitting of a radar interrogation pulse, or series of such pulses can be used in the present system to warn other radars that this unit is about to transmit its interrogation pulse. The following discussion provides an example of such a system.

The prior art contains ample showings to illustrate a radar system with a pulse repetition trigger of the type which sends out an arm pulse, then waits a certain number of microseconds, and then sends out a radar interrogation pulse. Such a system can easily accommodate twelve separate radar units all equipped with "courtesy" circuits according to the present invention. The system, however, is not limited to twelve units, except in the particular numerical example described at the present time. Each radar has its own built-in time clock which corresponds with the 100 kc. clock pulse oscillator 10 of the present disclosure. These clock units are relatively stable, but they are not mutually synchronized and in fact need be provided with only the accuracy that one can expect to obtain by the use of normal crystal-controlled oscillators. This provides an accuracy whose error does not exceed one part in $10^4$. In the apparatus according to the present disclosure which initiates an arm pulse approximately 10,000 microseconds after its next preceding interrogation pulse, these arm pulses can be transmitted by an omnidirectional antenna and can be used to set up an AGC level in other participating radar receiver units, which level provides these other radar units with a threshold indicating the approximate signal intensity which can be expected on the main interrogation pulse. Then after a 250-microsecond delay, the main radar interrogation pulse is transmitted on the directional antenna. After this transmission the radar "listens" for another 240 microseconds, for a scanning range of 20 miles, or for a longer or shorter period of time in the event that a greater or lesser range is employed. According to the present invention the receipt of an arm pulse in any listening radar, which has not yet transmitted its pulse will inhibit transmission of that radar's own arm pulse by resetting its counter 20 to zero count for a period of 540 or 700 microseconds, depending on which of the two output counts of the counter 20 is employed at the instant in question. By inhibiting transmission of all of the other radar arm pulses, there results the situation in which each radar, having once sent out its arm pulse, is free to perform its interrogation pulse function followed by a listening period without danger of interference by any of the other radar units.

It is desirable that the 100 kc. clock pulse oscillators in all of the radars be fairly accurate so that once the order of transmission is established by aligning the various radars in sequential order, which is initially established by a random process, the radars will tend to stay in this order despite the temporary fade-out conditions when some of the radars are near the outer limits of the range of the system. By delaying the tranmission from 540 to 700 microseconds after a radar receives an arm pulse sent out by another radar, there is established a sufficient guard space to eliminate any likelihood of mutual interference. The amount of jitter introduced by the jitter source 30, assuming that it is tied to the 400-cycle power line within an aircraft, is about 160 microseconds which will be sufficient to insure that two radars which happen to fall into step with each other are knocked out of step in a relatively short interval of time.

Adding together all of these various time functions, it appears that each radar has at least a 540-microsecond guard space plus a one-way range guard space up to about 125 microseconds plus a 160-microsecond jitter, or a total of 825 microseconds allocated to each radar in a twelve unit system. Thus, the use of a pulse repetition frequency of approximately 100 pulses per second allows the inclusion of up to twelve participating radars in the system. By reducing the pulse repetition frequency to approximately 75 pulses per second, a system can be provided which will accommodate sixteen helicopters. As stated above, the present inventive concept does not depend on whether the type of radar involved issues only a single interrogation pulse, or whether it issues coded arm pulses followed by a subsequent interrogation pulse. In any event, the receipt of a strong transmitted pulse from another radar on the same frequency and within the time interval between zero count and transmission of its own pulse is sufficient to cause the system to pause for the aforementioned interval of 540 or 700 microseconds before again attempting to transmit its own pulse.

The practical embodiment of the invention discussed above in detail was based on the assumption that each radar transmits only one interrogation pulse within each interval during which it is enabled, but the concept of the present invention is broad enough to include other systems wherein a plurality of pulses are transmitted during each interval within which the radar is enabled, so that the radar performs plural cycles of transmitting and then listening for echoes during its enabled interval and before it becomes silent and waits while other radars function. As discussed above, the present system includes a plurality of guard spaces or delay intervals designed to account for the spatial separations between radars so that the pulse from one radar will have time to travel to another radar and inhibit it. If each radar transmits only one pulse in each of its transmit intervals, then each pulse must also be accompanied by and thereby expend a whole guard space in each cycle of the system. On the other hand, if a radar transmits a large number of pulses during each interrogation interval but requires only one guard space for each group of pulses, then the number of guard spaces expended is reduced by the number of pulses transmitted during that interval in excess of one. In this way the target definition of the radars can be improved by using the saved dead-time of the time base for transmitting more pulses from each radar. It may even be advantageous to extend the transmitting interval of each radar to include enough pulses to cover one complete scan cycle of the radar antenna before the radar lapses into silence to await subsequent performance by the other radars in the system. In this multiple-pulse type of operation, the PRF Trigger P would be permitted to run freely at its own frequency for a certain time or for a certain number of pulses after it is initially enabled by the Courtesy Circuit C, and then shut itself off after this function is completed. The proportioning of the time base would have to be altered as compared with the above numerical example but the circuitry would be the same. For instance, the number of bits in the Counter 20 could be increased in order to lengthen the time base, or the rate of the Clock Oscillator 10 could be slowed to provide a total counting cycle duration great enough to provide each radar in the sequence with the longer interval of operation required to transmit multiple pulses, and to listen for echoes after each of these pulses. For example, if there are 16 helicopters and if the antenna of each rotates at 200 r.p.m., then each radar will require at least .3 second for its transmission interval to complete one antenna revolution. If the Clock Oscillator 10 runs at 200 c.p.s., representing 5000 microseconds per cycle, and the two outputs of the counter 20 are connected to counts 1 and 2, instead of 54 and 70, then each delay betwen count 0 and the triggering count will be either 5000 or 10,000 microseconds, which will be an adequate delay to permit the radar to make sure that no other radar is transmitting before it fires its first pulse. It is not necessary that the listening radar wait for an interval of 330,000 microseconds equalling the complete rotation cycle of another radar's antenna before trying again to fire its own pulse, but, on the contrary, it is better if the delay interval amounts to only around 5000 or 10,000 microseconds, or less so as to provide an adequate length of time for echoes from another radar to die down before trying again to begin its own cycle. In this way, a minimal amount of dead-time is included in the radar cycle, so that more "on"-time of the various radars may be had.

This invention is not to be limited to the particular embodiments shown and described for illustrative purposes, nor is it to be limited to the particular applications mentioned by way of example in the present specification. This invention is believed to have utility in connection with a wide variety of time-sharing communication systems occupying a common frequency, communications medium or other type of common channel in which mutual interference might normally occur.

We claim:

1. A system for establishing and maintaining a non-interfering sequence of operation for a number N of independent periodic communications units occupying a common channel and each having means for transmitting signals and having means for detecting signals from other units in the channel, comprising in each unit similar cyclic time measuring means for continuously measuring an interval of time beginning at a time zero and for determining at least one other instant of time not later than 1/N of said measured interval after time-zero, trigger means connected with the time measuring means and the transmitting means for triggering the latter at said other instant, reset means connected to the time measuring means and to the detecting means and rendered operative by the former after the time zero and before the transmitting means is triggered to reset the time measuring means to time-zero if a signal from another unit is received by the detecting means while the reset means is operative.

2. In a system as set forth in claim 1, said time measuring means including means for determining at least two different instants of time within the first 1/N portion of the measured interval, instant-selecting means connected between said time measuring means and said trigger means for actuating the latter at one of said instants, gate means connected to control said instant-selecting means, and means for randomly reversing the selection of the gate means.

3. In a system as set forth in claim 2, said reversing means comprising a flipflop, a source of signal which is random with respect to the cycle of the time measuring means, means coupling the flipflop to the time measuring means to reset it to the same condition of conductivity at some instant after the transmitting means is actuated, and means for coupling the flipflop to said random source and to the time measuring means to conditionally set the flipflop at another instant in the cycle of the time measuring means to another condition of conductivity depending upon the instantaneous value of the random signal.

4. A system for preventing mutual interference between plural periodic communications units occupying a common channel on a time-shared base and each unit having means for cyclically transmitting signals and having means for detecting signals from other units in the channel, comprising in each unit similar time measuring means for periodically measuring an interval of time beginning at a time zero and including a delay interval equal at least to the duration of a transmission cycle of a signal, means connected between the transmitting means and the measuring means for actuating the former after said delay, reset-means connected between the signal detecting means and the time measuring means for resetting the latter to time zero if a signal is detected from another unit during the delay interval, whereby each unit transmits at the end of said delay interval in the absence of a signal from another unit during that interval.

5. In a system as set forth in claim 4, said time measuring means including means for determining two delays of different duration during said measured interval, means for selecting one of two instants corresponding with the end of one of said delays and actuating the transmitting means at said one instant, gate means connected to control said instant-selecting means, and means for randomly reversing the selection of the gate means.

6. In a system as set forth in claim 5, said reversing means comprising a flipflop, a source of signal which is random with respect to the cycle of the time measuring means, means coupling the flipflop to the time measuring means to reset it to the same condition of conductivity at some instant after the transmitting means is actuated, and means for coupling the flipflop to said random source and to the time measuring means to conditionally set the flipflop at another instant in the cycle of the time measuring means to another condition of conductivity depending upon the instantaneous value of the random signal.

7. A system for preventing mutual interference between plural periodic communications units occupying a common channel on a time-sharing basis and having means for transmitting signals and means for detecting signals from other units on the channel, comprising separate similar time clocks in each unit, a continuous counter in each unit advanced by the clock therein and cyclically counting from zero count through a predetermined count representing an instant at which the unit transmits its signal and to a maximum count corresponding with zero count, trigger means connected to said counter and connected to operate said transmitting means at a said predetermined count, means connected between the counter and the trigger means for introducing a degree of jitter on successive cycles of the system into the interval of time between the zero count and the instant of triggering the transmitter, a zero-reset circuit for resetting the counter to zero and connected to the detecting means for actuation thereby in response to a received signal from another unit, and zero-reset inhibit means coupled to the counter and to the zero-reset circuit to disable the latter while the former is counting between said predetermined count and the next succeeding zero count.

8. In a system as set forth in claim 7, said jitter introducing means including means for providing at least one other instant for operating the transmitting means at a count later than zero count, instant-selecting means connected between said counter means and said trigger means for actuating the latter at one of said instants, and means for randomly reversing said selecting means.

9. In a system as set forth in claim 8, said reversing means comprising a flipflop, a source of signal which is random with respect to the cycle of the time clock, means coupling the flipflop to the counter to reset it to the same condition of conductivity at some instant after the transmitting means is actuated, and means for coupling the flipflop to the random source for conditionally changing its condition of conductivity depending upon the instantaneous value of said random signal, and said last mentioned means being connected to the counter and operated at a count lying outside of the interval between the two instants for actuating the trigger means.

10. In a system as set forth in claim 7, said zero-reset circuit comprising a reset flipflop connected to said counter and inoperative thereon when reset and connected with said time clock to be reset by the output thereof, gate means coupling the signal detecting means to the flipflop to actuate the latter to the other condition of conductivity when a signal is detected from another unit, and said zero-reset inhibit means comprising a second flipflop coupled to the gate means to control whether the latter conducts, the second flipflop being controlled by the counter means to block the gate when the trigger means is actuated and unblock the gate at zero count.

11. A radar apparatus including a transmitter, a receiver, a modulator for pulsing the transmitter and means for triggering the modulator, comprising a clock oscillator, continuous cyclic counter means advanced by the oscillator for counting from a zero count through a predetermined triggering count to a maximum count corresponding with zero count, trigger gate means coupled with the counter and with the triggering means and actuating the latter at said triggering count of the former, a zero-reset circuit connected with the counter for resetting it to zero, reset gate means connected between the receiver and the zero-reset for actuating the zero-reset circuit gate means upon receipt of a signal from another radar by the receiver and the reset gate means being connected for control by the counter means for rendering the zero-reset circuit effective only during the interval from zero count to said triggering count.

12. In apparatus as set forth in claim 11, said counter means comprising a multiple-bit counter having binary outputs associated with each bit, diode logic means connected with the counter and determining the zero and triggering counts, and said reset gate means including a flipflop coupled with the diode logic means and actuated to one conductivity condition at count zero and to the other conductivity condition at the triggering count, and said flipflop controlling the blocking of the zero-reset circuit depending on its condition of conductivity.

13. In apparatus as set forth in claim 12, said zero-reset circuit including a second flip-flop having a first conductivity condition triggered by the reset gate and a second conductivity condition to which it is reset by the clock oscillator, the second condition being normally maintained and the first condition causing resetting to zero of the counter.

14. A radar apparatus including a transmitter, a receiver, a modulator for pulsing the transmitter and means for triggering the modulator, comprising a clock oscillator, continuous cyclic counter means advanced by the oscillator for counting from a zero count through at least two possible triggering counts to a maximum count corresponding with zero count, trigger gate means coupled with the counter and with the triggering means and actuating the latter at one of said triggering counts of the former, triggering-count selecting means connected between the counter and the triggering means for determining which triggering count is selected, means for reversing said selecting means at a rate which is random with respect to the cycle of said counter, a zero-reset circuit connected with the counter for resetting it to zero, and reset gate means connected between the receiver and the zero-reset circuit for actuating the latter upon receipt of a signal from another radar by the receiver.

15. In apparatus as set forth in claim 14, said counter means comprising a multiple-bit counter having binary outputs associated with each bit, diode logic means connected with the counter and determining the zero and triggering counts, and said reset gate means including a flipflop coupled with the diode logic means and actuated to one conductivity condition at count zero and to the other conductivity condition at the triggering count, and said flipflop controlling the blocking of the zero-reset circuit depending on its condition of conductivity.

16. In apparatus as set forth in claim 15, said zero-reset circuit including a second flipflop having a first conductivity condition triggered by the reset gate and a second conductivity condition to which it is reset by the clock oscillator, the second condition being normally maintained and the first condition causing resetting to zero of the counter.

17. In apparatus as set forth in claim 14, said counter comprising a multiple-bit counter having binary outputs associated with each bit, diode logic means for determining each triggering count, and said triggering count selecting means comprising a flipflop connected to alternatively bias one or the other of said logic means conductive and said flipflop being controlled by said reversing means.

18. In apparatus as set forth in claimed 17, said reversing means including gate means connected to the counter means and resetting the flipflop to one condition of conductivity each time the triggering means is actuated, a source of signal which is random with respect to the cycle of the counter, an "and" gate connected with said source and with the zero count of the counter means and connected to deliver a signal to the flipflop for conditionally changing its condition of conductivity depending on the value of the random signal at the zero count.

19. In apparatus as set forth in claim 14, reset-gate inhibit means connected for control by the counter means and coupled to the reset gate for rendering the latter ineffective during the interval from the selected triggering count to the following zero count.

References Cited in the file of this patent
UNITED STATES PATENTS

| | | |
|---|---|---|
| 2,485,886 | Johnstone | Oct. 25, 1949 |
| 2,516,296 | Brown | July 25, 1959 |
| 3,109,069 | Kroll | Oct. 29, 1963 |